(12) United States Patent
Wang et al.

(10) Patent No.: US 12,215,858 B2
(45) Date of Patent: Feb. 4, 2025

(54) BURNING DEVICE FOR COMBUSTION CALORIMETRY AND COMBUSTION ANALYSIS OF POLYMERIC MATERIALS

(71) Applicant: Sichuan University, Chengdu (CN)

(72) Inventors: Yuzhong Wang, Chengdu (CN); Teng Fu, Chengdu (CN); Xuan Song, Chengdu (CN); Ran Wang, Chengdu (CN); Yajie Yang, Chengdu (CN); Yahan Kuang, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/764,204

(22) Filed: Jul. 4, 2024

(65) Prior Publication Data
US 2025/0012438 A1 Jan. 9, 2025

(30) Foreign Application Priority Data
Jul. 6, 2023 (CN) .......................... 202310824362.1

(51) Int. Cl.
  F23D 14/56 (2006.01)
  F23D 14/02 (2006.01)
  G01N 25/22 (2006.01)
(52) U.S. Cl.
  CPC ............. F23D 14/56 (2013.01); F23D 14/02 (2013.01); G01N 25/22 (2013.01)
(58) Field of Classification Search
  CPC .......... F23D 14/56; F23D 14/02; G01N 25/22
  See application file for complete search history.

(56) References Cited

U.S. PATENT DOCUMENTS

| | | | | |
|---|---|---|---|---|
| 5,216,885 A | * | 6/1993 | Taniguchi | F23R 3/02 60/737 |
| 2005/0188702 A1 | * | 9/2005 | Bachovchin | F23D 14/66 60/737 |

(Continued)

FOREIGN PATENT DOCUMENTS

| CN | 1201443 A | 12/1998 |
|---|---|---|
| CN | 106093285 A | 11/2016 |

(Continued)

OTHER PUBLICATIONS

CN-112555832-A translation (Year: 2024).*

Primary Examiner — Jennifer Wecker
Assistant Examiner — Jonathan Bortoli
(74) Attorney, Agent, or Firm — Bayramoglu Law Offices LLC

(57) ABSTRACT

A soot-suppression flame-separation combustion device for combustion calorimetry and in-situ free radicals monitoring is mainly composed of a premixed combustion gas guide tube, an inner flame generating seat, an oxidation flame separation guide, and a sample combustion chamber. The inner flame generating seat is arranged in the premixed combustion gas guide tube, the oxidation flame separation guide is arranged on the premixed combustion gas guide outlet end of the premixed combustion gas guide tube, the sample combustion chamber is a cavity arranged inside the oxidation flame separation guide, and the oxidation flame separation guide is evenly arranged with at least 4 oxidation flame separation guide paths in a manner of surrounding the sample combustion chamber. The combustion device utilizes the special structure of the oxidation flame separation guide to suppress the generation of smoke and limit the smoke particles to a specific combustion area.

9 Claims, 16 Drawing Sheets

(56) References Cited

U.S. PATENT DOCUMENTS

2020/0240628 A1    7/2020   Deller et al.
2021/0190310 A9*   6/2021   Deller ........................ F23C 9/08

FOREIGN PATENT DOCUMENTS

| | | | | |
|---|---|---|---|---|
| CN | 110657433 | A | | 1/2020 |
| CN | 112555832 | A * | 3/2021 | ............ F23D 14/02 |
| CN | 114018774 | A | | 2/2022 |
| CN | 114965319 | A | | 8/2022 |
| DE | 10258187 | A1 | | 3/2004 |
| JP | S54133635 | A | | 10/1979 |
| JP | 2000220807 | A | | 8/2000 |
| TW | 201224823 | A | | 6/2012 |

* cited by examiner

BURNING DEVICE FOR COMBUSTION CALORIMETRY AND COMBUSTION ANALYSIS OF POLYMERIC MATERIALS

CROSS REFERENCE TO THE RELATED APPLICATIONS

This application is based upon and claims priority to Chinese Patent Application No. 202310824362.1, filed on Jul. 6, 2023, the entire contents of which are incorporated herein by reference.

TECHNICAL FIELD

This present invention belongs to the field of analysis instruments for burning measurements of polymeric materials, and specifically relates to a soot-suppression flame-separation combustion device which can be applied for combustion calorimetry, and on-line in-situ monitoring free radicals produced during the combustion reactions.

BACKGROUND

Combustion is a phenomenon in which a substance glows and heats up as a result of intense oxidation. Every step in the leapfrog development of human civilization is closely related to the study of combustion. A million years ago, the use of open fire existed in nature totally changed the lifestyle of ancient mankind; three hundred years ago, the proposed combustion theory heralded the opening of the door of the modern chemical industry; many important inventions in two industrial revolutions from the 19th to the 20th century are closely related to combustion research; nowadays, from the kitchen fire to the thermal power plant, from the automobile to the rocket, combustion has long been inextricably linked to the daily lives of human beings. Unfortunately, due to the high complexity of combustion reactions, our knowledge and understanding of the nature of combustion has remained very superficial until today.

The combustion process is a complex process that simultaneously couples fluid flow, heat and mass transfer, and chemical-physical changes. The understanding and knowledge of combustion science is mainly based on the advanced combustion diagnostic techniques, which make great contributions to revealing combustion mechanisms, verifying combustion theories, constructing combustion models, and optimizing the control of combustion processes. Among them, spectroscopy-based combustion diagnostic techniques have received great attention for their excellent in-situ monitoring and non-invasiveness performance, and have been successfully applied to monitor the combustion free radicals of gaseous fuels. However, its application to the combustion monitoring of solid/liquid fuels faces two important challenges: (1) unlike gas/liquid fuel, a considerate number of polymers do not undergo self-sustaining chemical reactions after forced ignition (also called as "self-extinguishing"). An external source (generally use the gas flame) is essential to support sample pyrolysis and initiate/maintain combustion chains, which, inevitably, cause strong interference to free radicals monitoring. (2) almost all polymer flames produce substantial quantities of hot carbon particles (also known as soot, if not otherwise specified, "hot carbon particles" and "soot" in the present invention represent a class of substances), which largely reduces the measurability of combustion zone and leads to less effective or even complete failure for most optical diagnostics due to its incandescence gives the diffusion flame strong luminosity/scattering/absorption at the relevant wavelength.

With the continuous development of materials science, organic polymer materials (also known as polymers, if not specified, the invention of the "organic polymer materials" and "polymers" are on behalf of a class of compounds) gradually replace the metal and inorganic non-metallic materials, widely used in the building materials, electronic and electrical, transportation, aerospace, mining, daily furniture, interior decoration and other fields, and have become an essential part of modern human production and life. Unfortunately, most of polymers have relatively low ignition point and will release a large amount of heat, smoke and toxic gases when burned. Even if the ambient temperature is below the ignition point, softening and deformation may occur, which may pose a great threat to the safety of people's lives and property. Generally, there are two main types of effective prevention and control methods for fire safety issues of polymer materials. One type is represented by fire alarm equipment. Based on the key characteristic information released before/when the polymer burns, it can quickly identify and deal with the fire before it fully develops, and minimize the disaster caused by fire safety issues; another method focuses on the material itself, through the analysis of the polymer combustion mechanism/behavior, to guide the synthesis of polymer materials with a lower fire risk or fire hazard, and try to solve the polymer fire safety problem from the source. It is worth noting that both approaches rely on accurate control of the combustion process of polymer materials, that is, an in-depth understanding of polymer combustion behavior and mechanism.

It is generally accepted that polymer combustion, similar to most solid fuel combustion, is a multi-stage, highly coupled process consisting of three major steps: (1) devitrification and melting of the polymer body during the heating process, (2) gasification and/or thermal decomposition resulting from elevated temperatures to produce combustible volatile fuels, and (3) mixing of the flammable volatile fuels with the oxidant, followed by homogeneous combustion in the gas phase based on a free radical chain reaction mechanism. At present, a large amount of research focuses on the physical/chemical changes related to the condensed phase (step 1 and step 2), and speculates on the possible polymer combustion mechanism based on its gasification/pyrolysis behavior. However, due to the neglect of the gas-phase combustion process (step 3) involving the open flame, most of these speculations are unreasonable or even wrong. In addition, some studies have viewed polymer combustion as a simple integration of the three independent processes described above and used coupled instruments to monitor possible products/free radicals in each step. These works tend to ignore the coupling relationship between the processes, resulting in the corresponding results lacking reference value. In particular, the heat generated in the combustion zone and the large number of free radicals (OH radicals, $O_2$ radicals, CH radicals, $C_2$ radicals, etc.) during polymer combustion process can significantly affect, or even change, the pyrolysis behavior/mechanism of polymers (also known as "feedback effects"). Therefore, in-situ intermediate/product monitoring techniques of polymer combustion is of great pivotal. It is worth noting that since most species in the burn zone are chemically unstable and highly susceptible to external testing, the in-situ monitoring technology should be non-invasive.

In view of these issues, the emergence of a combustion diagnostic technique based on spectroscopy that can effectively address the negative effects of the introduction of auxiliary flames and the large number of soot when applied to solid/liquid combustion samples, especially polymer samples, will be extremely beneficial for researchers to further deepen their understanding of combustion behaviors and mechanisms.

SUMMARY

In view of the drawbacks of the above-described prior art, the present invention provides a soot-suppression flame-separation combustion device for combustion calorimetry and in-situ free radicals monitoring.

To achieve the above purpose, the present invention is implemented by adopting a technical solution consisting of the following technical measures.

In one aspect, the present invention provides a soot-suppression flame-separation combustion device for combustion calorimetry and in-situ free radicals monitoring, mainly including a premixed combustion gas guide tube, an inner flame generated seat, an oxidizing flame separation guide member, and a sample combustion chamber;

The inner flame generated seat disposed inside the premixed combustion gas guide tube provides an annular protruding structure perpendicular to the direction of the premixed combustion airflow therein, wherein the tip of the annular protruding structure is at least 0.1 mm away from the inner wall of the premixed combustion gas guide tube to ensure the inner flame being formed at the end of the annular protruding structure;

The oxidizing flame separation guide member disposed at the outlet of the premixed combustion gas guide tube includes, a sample combustion chamber disposed inside the oxidizing flame separation guide member and facing the inner flame generated seat to ensure that the sample combustion chamber can be directly heated by the inner flame; at least four oxidizing flame separation guide paths disposed around the sample combustion chamber in an equally spaced distribution which are connected with the premixed combustion gas guide tube, wherein the length of oxidizing flame separation guide paths is set as 5-500 mm, and the diameter of the guide paths or the equivalent diameter of guide paths is set as 2-200 mm to ensure the oxidizing flame (outer flame) being formed at the top of the oxidizing flame separation guide paths;

The sample combustion chamber is provided with a combustion products outlet connected to the outside in the opposite direction towards the inner flame generated seat, and a combustion products nozzle is disposed at the combustion products outlet, wherein the diameter or the equivalent diameter is set as $1/10$-$4/5$ of the diameter or the equivalent diameter of the sample combustion chamber to form a jet of combustion products;

In the present invention, the premixed combustion gas guide tube is commonly connected to the device providing premixed combustion gas and guides the airflow of the premixed combustion gas. In general, the premixed combustion gas guide tube can be a single-pass tube structure or a multi-pass tube structure, but it is necessary to ensure that one tube-end can be fed with the premixed combustion gas, and another tube-end is the outlet of the premixed combustion gas guide tube; when the premixed combustion gas guide tube is a multi-pass tube structure, two or more ports can be respectively fed with different combustible gases, oxygen, etc., and the premixing of the combustion gas is completed inside the premixed combustion gas guide tube.

It is noted that although the premixed combustion gas guide tube in the present invention may be a single-pass tube structure or a multi-pass tube structure, and in the case of the multi-pass tube structure, the airflow guide direction of the premixed combustion gas may exist in multiple directions at the same time. However, based on the natural law and common sense which the premixed combustion gas is generally at the flame end, it should be known to those skilled in the art that the design of the airflow guide of the premixed combustion gas near the flame end should follow a straight-line design pattern as much as possible to ensure sufficient combustion.

In one of the technical solutions, the premixed combustion gas guide tube is a single-pass tube structure, wherein the airflow guide of the premixed combustion gas is in a single straight-line direction, and the direction of the oxidizing flame separation guide paths is in the same direction as that of the airflow guide of the premixed combustion gas.

In the present invention, the premixed combustion gas that can be used for the premixed combustion is a common choice in the art. For instance, at least one of coal gas, natural gas, methane, propane, butane, ethylene, acetylene, hydrogen, and others, can be selected to mix with air, oxygen, and others, to form the premixed combustion gas. Typically, the device providing the premixed combustion gas should be with the function of adjusting the flow rate to ensure that the combustion reaction takes place, such as through a Bunsen burner, McKenna burner, etc.

In the present invention, the principle of separating the combustion zone of the premixed combustion gas into the inner flame and the oxidizing flame (outer flame) by using the inner flame generated seat and the oxidizing flame separation guide member is refer to the Smithells flame in this field, namely, the fuel and oxidant are not under the stoichiometric ratios, but the condition of fuel-rich (fuel excess), wherein the inner flame is a premixed flame produced by the combustion of the premixed combustion gas and the primary oxidant, while the oxidizing flame (outer flame) is a diffusion flame formed by further combustion of the incomplete combustion products of the inner flame with the atmospheric air. The inner flame can therefore be spatially separated from the outer flame by the flame separator, but it should be noted that the flame separator in the public knowledge does not have the sample combustion chamber and the oxidizing flame separation guide paths.

In one of the technical solutions, to ensure that the inner flame produced on the inner flame generated seat pyrolyzes the sample more effectively, the distance between the sample combustion chamber and the inner flame generated seat is 5-300 mm.

In one of the more preferred technical solutions, the distance between the sample combustion chamber and the inner flame generated seat is 5-120 mm.

In one of the technical solutions, to ensure that the inner flame produced on the inner flame generated seat pyrolyzes the sample more effectively, the chamber of the sample combustion chamber is directly facing to the inner flame generated seat, and the structural center line of the chamber coincides with the structural center line of the inner flame generated seat along the airflow guide direction of the premixed combustion In one of the technical solutions, to ensure that the inner flame produced on the inner flame generated seat pyrolyzes the sample more effectively, the chamber of the sample combustion chamber is cylindrical with the equivalent diameter of 5-100 mm and the height of 3-100 mm.

In one of the more preferred technical solutions, the chamber of the sample combustion chamber is cylindrical with the equivalent diameter of 5-50 mm and the height of 3-80 mm.

In the present invention, the oxidizing flame separation guide member is provided with at least four oxidizing flame separation guide paths disposed around the sample combustion chamber in an equally spaced distribution. The equally spaced distribution may be in such a way that, centered around the sample combustion chamber, adjacent oxidizing flame separation guide paths are at the same distance and angle from each other, wherein the angle is the one formed by a line segment respectively connecting the structural center point of the adjacent oxidizing flame separation guide paths to the structural center point of the sample combustion chamber.

In one technical embodiment, considering the cost, the oxidizing flame separation guide member is provided with at least four oxidizing flame separation guide paths disposed around the sample combustion chamber in an equally spaced distribution, wherein the equally spaced distribution being in the form of a circle formed by the oxidizing flame separation guide paths surrounding the sample combustion chamber, and the connection of the structural centroids of the oxidizing flame separation guide paths may form a circle.

In the present invention, the premixed combustion gas guide tube, the inner flame generated seat, the oxidizing flame separation guide member, and sample combustion chamber may be integrally molded or of split design; the premixed combustion gas guide tube, and the inner flame generated seat may be integrally molded or of split design; the oxidizing flame separation guide member, and the sample combustion chamber may be integrally molded or of split design.

In one of the preferred technical solutions, to obtain the better soot suppression effect of the device, resulting in a reduction in the flame radiation at 600-800 nm (caused by blackbody radiation from soot) during the combustion process over 20%:

The inner diameter of the premixed combustion gas guide tube is 20-30 mm, and the inner flame generated seat disposed inside the premixed combustion gas guide tube provided an annular protruding structure perpendicular to the direction of the premixed combustion gas guide tube, wherein the tip of the annular protruding structure is 0.5-2.0 mm from the inner wall of the premixed combustion gas guide tube to ensure the inner flame occurring at the annular protruding structure;

The oxidizing flame separation guide member disposed at the outlet of the premixed combustion gas guide tube including: a sample combustion chamber disposed inside the oxidizing flame separation guide member and facing the inner flame generated seat to ensure that the sample combustion chamber can be directly heated by the inner flame; 10-11 oxidizing flame separation guide paths disposed around the sample combustion chamber in an equally spaced distribution and communicated with the premixed combustion gas guide tube, wherein the length of oxidizing flame separation guide paths is set as 25-40 mm, and the diameter of the guide paths or the equivalent diameter of guide paths is set as 4.0-5.0 mm, to ensure the oxidizing flame occurring at the top of the oxidizing flame separation guide paths;

The chamber of the sample combustion chamber is cylindrical with the diameter of 10-15 mm and the height of 20-30 mm, and the distance between the sample combustion chamber and the inner flame generated seat is 20-60 mm; the sample combustion chamber is provided with a combustion products outlet connected to the outside in the opposite direction towards the inner flame generated seat, and the combustion products nozzle is disposed at the combustion products outlet, wherein the diameter or the equivalent diameter is set as $\frac{1}{5}$-$\frac{3}{5}$ of the diameter or the equivalent diameter of the sample combustion chamber to form a jet of combustion products.

The distance between the sample combustion chamber and the oxidizing flame separation guide paths is 2.5-5.0 mm.

In one of the more preferred technical solutions, to obtain the even better soot suppression effect of the device, leading to a reduction in the flame radiation at 600-800 nm (caused by blackbody radiation from soot) during the combustion process over 50%:

The inner diameter of the premixed combustion gas guide tube is 20-30 mm, and the inner flame generated seat disposed inside the premixed combustion gas guide tube provided an annular protruding structure perpendicular to the direction of the premixed combustion gas guide tube, wherein the tip of the annular protruding structure is 0.5-2.0 mm from the inner wall of the premixed combustion gas guide tube to ensure the inner flame occurring at the annular protruding structure;

The oxidizing flame separation guide member disposed at the outlet of the premixed combustion gas guide tube including: a sample combustion chamber disposed inside the oxidizing flame separation guide member and facing the inner flame generated seat to ensure that the sample combustion chamber can be directly heated by the inner flame; 8-9 oxidizing flame separation guide paths disposed around the sample combustion chamber in an equally spaced distribution and communicated with the premixed combustion gas guide tube, wherein the length of oxidizing flame separation guide paths is set as 25-40 mm, and the diameter of the guide paths or the equivalent diameter of guide paths is set as 4.0-5.0 mm, to ensure the oxidizing flame occurring at the top of the oxidizing flame separation guide paths;

The chamber of the sample combustion chamber is cylindrical with the diameter of 10-15 mm and the height of 20-30 mm, and the distance between the sample combustion chamber and the inner flame generated seat is 20-60 mm; the sample combustion chamber is provided with a combustion products outlet connected to the outside in the opposite direction towards the inner flame generated seat, and the combustion products nozzle is disposed at the combustion products outlet, wherein the diameter or the equivalent diameter is set as $\frac{2}{5}$-$\frac{3}{5}$ of the diameter or the equivalent diameter of the sample combustion chamber to form a jet of combustion products.

The distance between the sample combustion chamber and the oxidizing flame separation guide paths is 2.5-5.0 mm.

The present invention further provides an on-line combustion processes analysis instrument for combustion calorimetry and in-situ free radicals monitoring applied in combustion calorimetry, in situ on-line monitoring of combustion free radicals.

The main invention of the present invention is that, as shown in FIGS. 1A-1B, separating the original flame into an inner flame and an oxidizing flame (outer flame), wherein the inner flame retains most of the energy of the original flame, which can be used to support the continues pyrolysis of samples, and the outer flame contains only a trace amount of active radicals, which can be used to ignite the pyrolysis products (as shown in FIG. 2). On this basis, due to the special structure of the oxidizing flame separation guide member, the soot formation can be effectively inhibited and the produced soot can be confined to a specific combustion area, leading to a reduction in the interference from the soot produced during sample combustion and an improve in the applicability of spectral diagnostics techniques in combustion monitoring.

Wherein, the principle of the suppression of soot formation/confinement of soot formation region is mainly due to the fact that there is a gap between the equally distributed oxidizing flame separation guide paths in the oxidizing flame separation guide member with the special structure, the flame front of the outer flame is therefore not continuous but with significant gaps during combustion (as shown in FIGS. 3A-3B), which allows the exchange of gases between the outside and inside of the outer flame, and particularly allowing the outside air reaching to the sample combustion chamber through the gap.

When the sample inside the sample combustion chamber begins to pyrolyze, with the increasing pressure inside the sample combustion chamber, the flow rate of the pyrolysis gas out of the combustion products nozzle (reduce the size of the outlet of the sample combustion chamber) significantly increase. The gas flow with relatively high flowrate above the sample combustion chamber will lead to a reduction in pressure due to the Venturi effect, and the outside air will be pressed into the outer flame, thus creating a rapid premixing region of pyrolysis gases and air above the sample combustion chamber (as shown in FIGS. 4A-4C of the accompanying specification). The efficient premixing of pyrolysis gases and air will significantly reduce the local carbon/oxygen ratio in the combustion zone, and confine the region of soot inception and blackbody radiation, resulting in the suppression of soot formation/confinement of soot formation region.

However, it should be emphasized that the suppression of soot formation/confinement of soot formation region mainly relies on the special structure of the oxidizing flame separation guide member. And during the research and development processes, the inventors of the present invention have found that for the way of setting up the oxidizing flame separation guide paths in the oxidizing flame separation guide member under a non-equal distribution condition, as well as the number, length and equivalent diameter of the oxidizing flame separation guide paths, will significantly affect the suppression and confinement effect of soot formation. In the present invention, the sample combustion chamber is innovatively set under the oxidizing flame (outer flame), and only the inner flame is used to pyrolyze the sample, which is conducive to preventing the interference factor of the outside air, and is also conducive to controlling the temperature of the sample combustion chamber; in addition, the flow rate of the pyrolysis gas in the sample combustion chamber and the special structure of the oxidizing flame separation guide member have formed a certain cooperation, so as to achieve the suppression and confinement effect of the soot formation to a greater extent.

It is worth noting that the person skilled in the art should know that the structural enlargement and reduction, structural changes, modifications, substitutions, combinations and simplifications made in accordance with the characteristic essence and principle of the present invention should all be equivalent replacement and are included in the scope of protection of the present invention. Based on the analysis purpose of flame separation, sample pyrolysis, and further combustion of intermediate combustion products, the size control of the inner and outer flames should not be too large, that is, the amount premixed combustion gas per unit time and the size of the premixed combustion gas guide tube should not be too large, but the inner diameter of the premixed combustion gas guide tube can be adjusted appropriately based on the selection of different premixed combustion gases, but it should not normally be larger than 630 mm. To better illustrate the present invention and provide a technical solution for reference, when the Bunsen burner is used to provide premixed combustion gases of air and gas at 5 $m^3$/h, the inner diameter of the premixed combustion gas guide tube is preferably 20-50 mm.

In one of the technical solutions, to facilitate the adjustment of the distance between the sample combustion chamber and the inner flame generated seat, so as to facilitate the control of the pyrolysis temperature of the sample in the sample combustion chamber, the premixed combustion gas guide tube is an inner-outer casing structure, where the inner tube can be able to slide inside the outer tube; the inner flame generated seat is formed by the head of the inner tube and the wall of the outer tube (i.e., an annular protruding structure refers to the tube wall of the inner tube), and the distance between the sample combustion chamber and the inner flame generated seat is adjusted by adjusting the position of the inner tube. It should be noted that the inner-outer casing structure should prevent outside gas from entering the premixed combustion gas guide tube through the gap of the inner-outer casing. To facilitate the monitoring of the combustion behavior of the inner flame and the outer flame, the premixed combustion gas guide tube is divided into a three-layer casing structure of an outer tube, a connecting tube, and an inner tube from outside to inside, wherein the connecting tube nested and fixed inside the outer tube, the inner tube can slide in the connecting tube, and the inner flame generated seat is composed of the end of the inner tube in the connecting tube (that is, the annular convex structure refers to the wall of the inner tube). By adjusting the position of the inner tube, the distance between the sample combustion chamber and the inner flame generated seat is adjusted.

Based on the soot-suppression flame-separation combustion device for combustion calorimetry and in-situ free radicals monitoring, which pyrolyzes samples mainly by means of an inner flame, the inventors of the present invention found that the distance between the sample combustion chamber and the inner flame generated seat can be adjusted in the course of practical use, so as to control the pyrolysis temperature of samples in the sample combustion chamber.

Based on this, to better illustrate the technical effect and provide a technical solution for reference:

When the oxidizing flame separation guide member is provided with 8 oxidizing flame separation guide paths around the sample combustion chamber in an equally spaced distribution, wherein the length of oxidizing flame separation guide paths is set as 25-40 mm, the diameter of the guide paths or the equivalent diameter of guide paths is set as 8-10 mm, the flow rate of air and premixed combustion gas is set as 45-55 L/h in the premixed combustion gas guide tube, and the inner diameter of the pre-mixed combustion gas duct is set as 20-30 mm. In order for the pyrolysis temperature of the sample combustion chamber to reach 500-550° C.: the distance between the sample combustion chamber and the inner flame generated seat is 20-60 mm; in order for the pyrolysis temperature of the sample combustion chamber to reach 600-650° C.: the distance between the sample combustion chamber and the inner flame generated seat is 20-50 mm; in order for the pyrolysis temperature of the sample combustion chamber to reach 700-750° C., the distance between the sample combustion chamber and the inner flame generated seat is 20-30 mm.

Based on the technical effect of the soot-suppression flame-separation combustion device for combustion calorimetry and in-situ free radicals monitoring in reducing the interference of the soot to spectral diagnostic techniques while producing separated flame and improving the applicability of spectral diagnostic techniques in combustion monitoring, the present invention also provides a combustion process online analysis instrument by using the combustion device:

On the other hand, the present invention also provides a combustion process online analysis instrument, which is composed of a soot-suppression flame-separation combustion device for combustion calorimetry and in-situ free radicals monitoring, and a spectrometer with a light-guide structure.

Since the soot-suppression flame-separation combustion device for combustion calorimetry and in-situ free radicals monitoring provided by the present invention has a good soot suppression effect, the spectrometer with a light-guide structure can be directly installed on the side of the outer flame to achieve on-line real-time analysis, which is the first-of-its-kind in the field of the present technology.

In the present invention, the spectrometer with a light-guide structure is a conventional instrument in the field of the present technology, such as a fiber-optic spectrometer.

BRIEF DESCRIPTION OF THE DRAWINGS

FIGS. 1A-1B are the digital images of the effect of flame separation using the soot-suppressing flame-separation combustion device for combustion calorimetry and in-situ free radicals monitoring in the present invention. Wherein, FIG. 1A is the digital image of the flame produced by the conventional laminar flow burner; FIG. 1B is the digital image of the flame produced by the soot-suppressing flame-separation combustion device for combustion calorimetry and in-situ free radicals monitoring.

FIGS. 4A-4C are the digital image and simulation result of the oxidizing flame (outer flame) before/after sample pyrolysis based on the combustion device in Embodiments 1 of the present invention. Wherein, FIG. 4A is the digital image of the oxidizing flame before sample pyrolysis; FIG. 4B is the digital image of the oxidizing flame after sample pyrolysis; FIG. 4C is the simulation result of the oxidizing flame after sample pyrolysis.

FIGS. 5A-5B are the digital image and spectrograms of the oxidizing flame (outer flame) produced during polymer combustion based on the combustion device in Embodiments 1 of the present invention. Wherein, FIG. 5A is the digital image of the oxidizing flame during the whole combustion process; FIG. 5B is the spectrograms of the oxidizing flame produced by the conventional laminar flow burner and the soot-suppressing flame-separation combustion device for combustion calorimetry and in-situ free radicals monitoring.

Figure 1A:
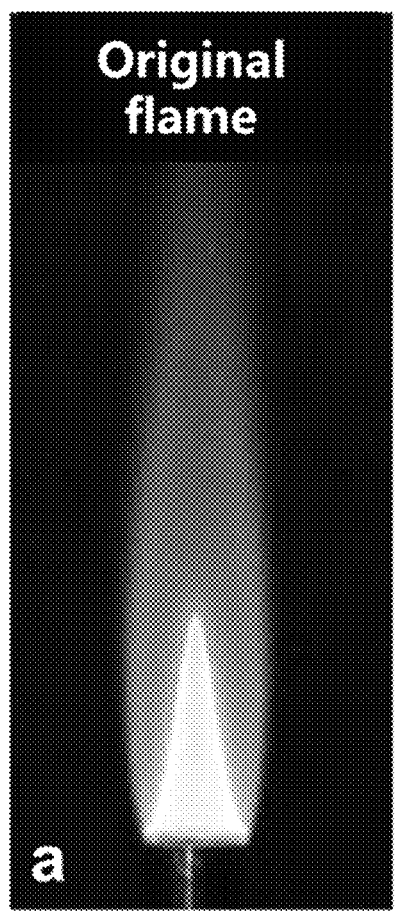
Figure 1B:
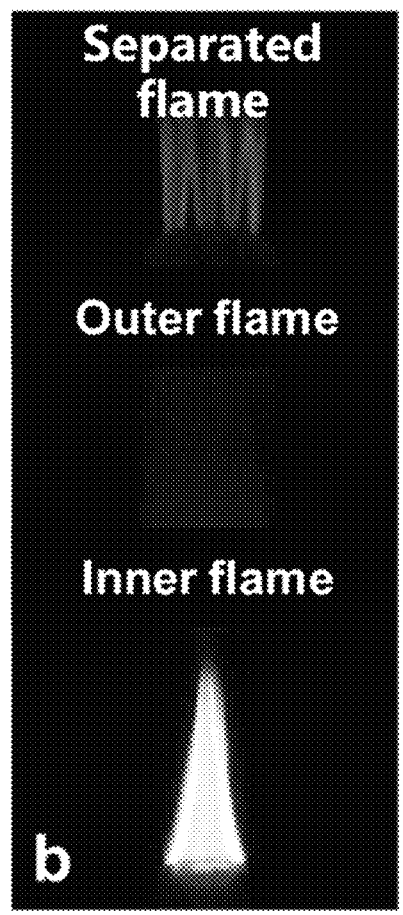
Figure 2:
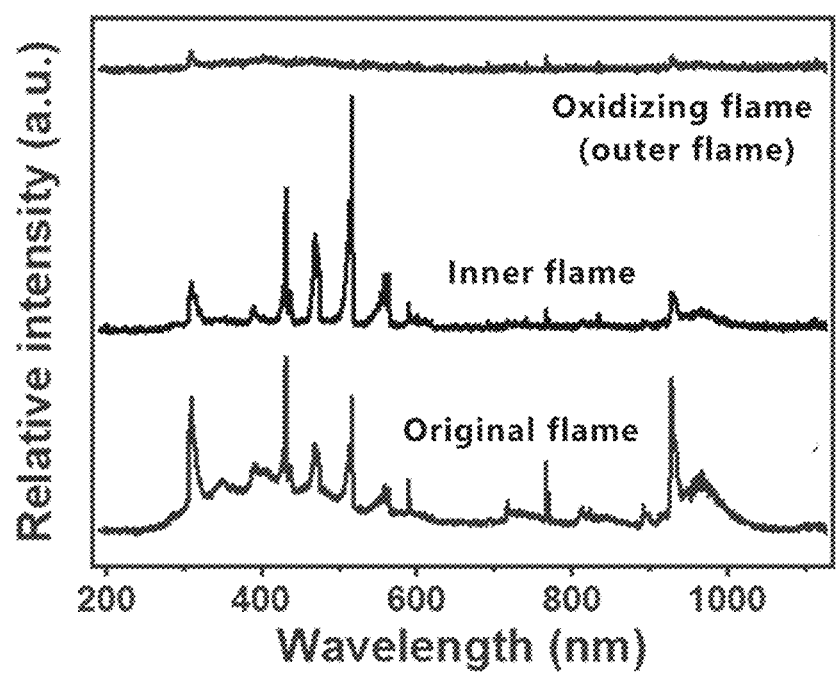
FIG. 2 is the spectrograms of the original flames, inner flame, and oxidizing flame (outer flame), wherein the inner flame retains most of the energy of the original flame and the oxidizing flame (outer flame) contains only trace amounts of free radicals.
Figure 3A:
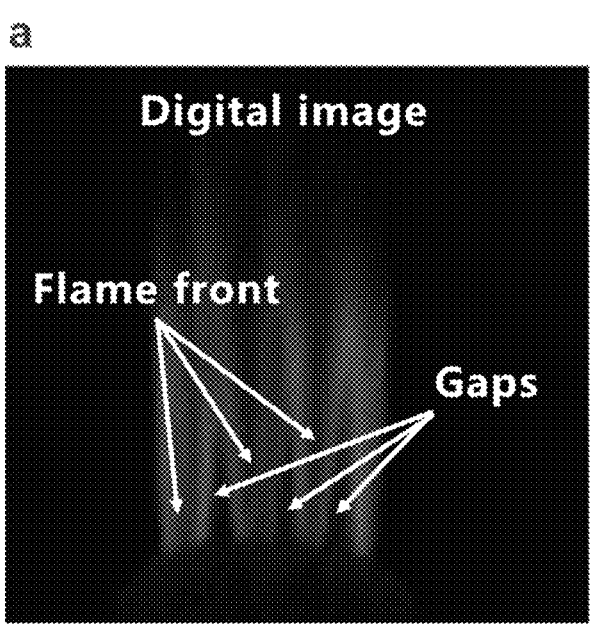
FIGS. 3A-3B are the digital image (FIG. 3A) and simulation result (FIG. 3B) of the discontinuous front of the oxidizing flame (outer flame) after flame separation based on the combustion device in Embodiments 1 of the present invention.
Figure 3B:
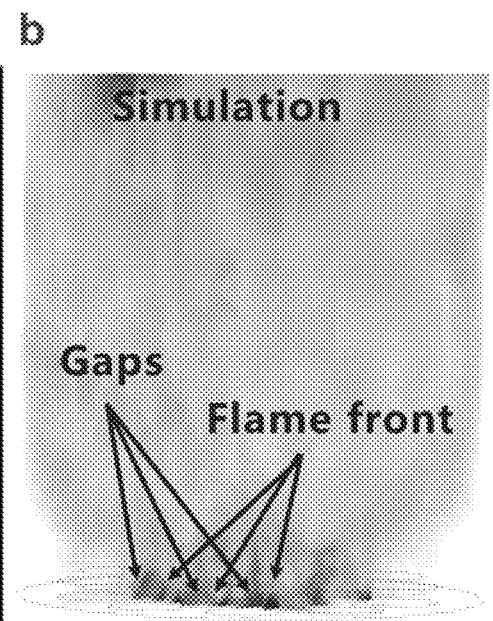
Figures 4A, 4B, 4C:
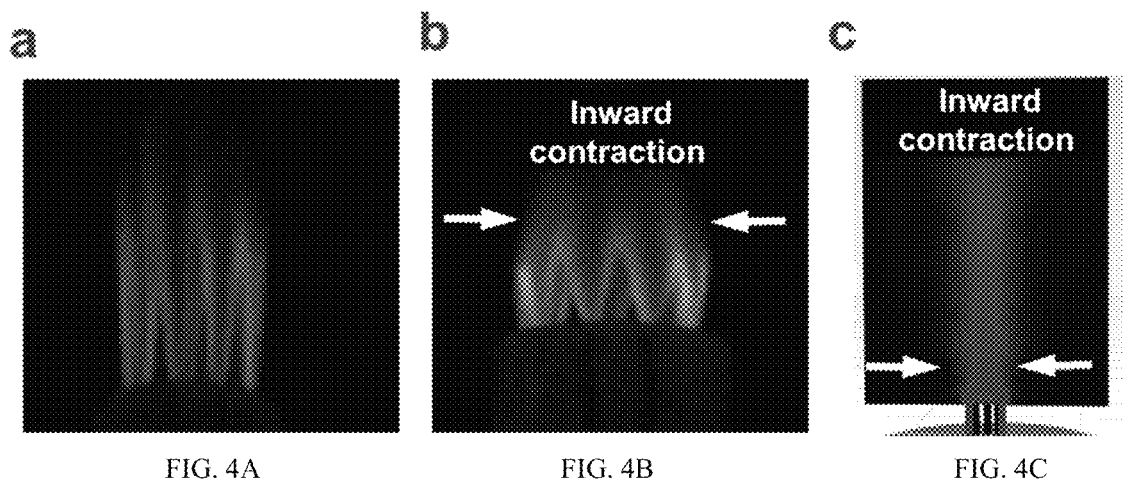
Figure 5A:
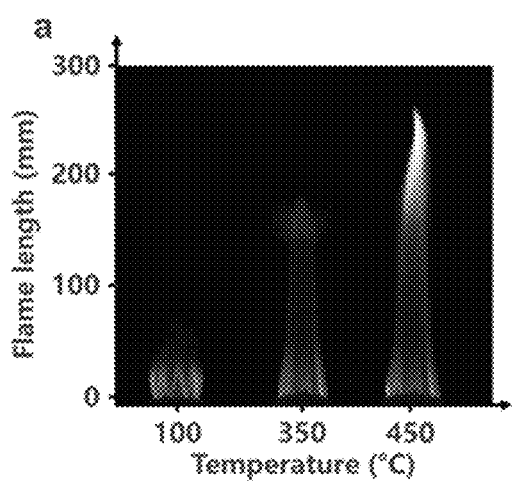
Figure 5B:
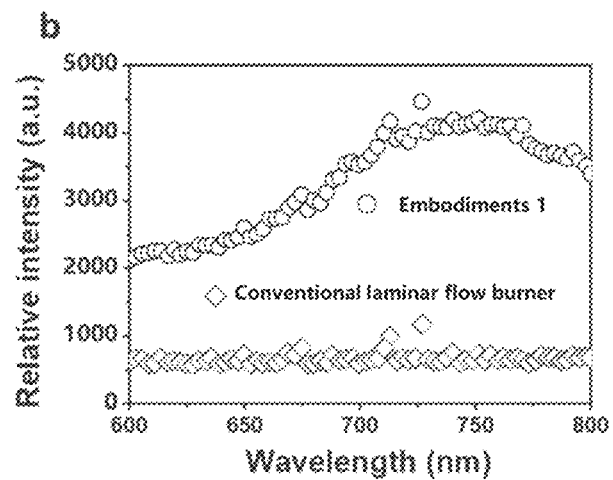

Wherein, 1-A is an outer tube, 1-B is an inner tube, 1-C is a connecting tube, 2 is an oxidizing flame separation guide paths, 3 is an inner flame generated seat, 4 is a sample combustion chamber, 5 is a combustion products nozzle, 6 is the soot-suppressing flame-separation combustion device for combustion calorimetry and in-situ free radicals monitoring, 7 is a spectrometer with a light-guide structure, 8 is a pre-mixed combustion gas supply device, 9 is a fixing frame, and 10 is a wind-proof observation cover.

DETAILED DESCRIPTION OF THE EMBODIMENTS

To better understand the present invention, the present invention is further described below by using the preferred embodiments and accompanying drawings. It is worth noting that the given descriptions are only intended to further illustrate the features and advantages of the present invention and are not a limitation of the invention. In fact, it will be apparent to those skilled in the art that various modifications and variations can be made in the present invention without departing from the scope or spirit of the invention. Some non-essential improvements and adjustments made to the present invention by those skilled in the art based on the content of the present invention should still fall into the protection scope of the present invention. The methods and applications of the present invention have been described by means of preferred embodiments, and it is obvious that the person concerned is able to realize and apply the technology of the present invention by making alterations or appropriate changes and combinations to the methods and applications described herein without departing from the content, spirit and scope of the present invention. While the following terms are believed to be fully understood by those of ordinary skill in the art, the following definitions are stated to help illustrate the disclosed subject matter of the present invention.

The present innovation will be explained in further detail in combination/conjunction with the reference embodiments. However, those skilled in the art should understand that these embodiments are only provided for illustrative purposes and are not considered as limitations to the protection scope of the present invention.

EMBODIMENT

The implementation plan of the present invention is further described below by using the embodiments and the accompanying drawings. It is worth noting that the given embodiments should not be considered as limitations to the protection scope of the present invention. Some non-essential improvements and adjustments made to the present invention by those skilled in the art based on the content of the present invention should still fall into the protection scope of the present invention. If specific conditions are not noted in the embodiments, the conditions should be followed as usual or as recommended by the manufacturer. If the manufacturer of the reagents or instruments used is not specifically noted, they are all conventional products that can be purchased commercially. This invention should not be construed as being limited to the specific embodiments described.

Embodiment 1

Figure 6:
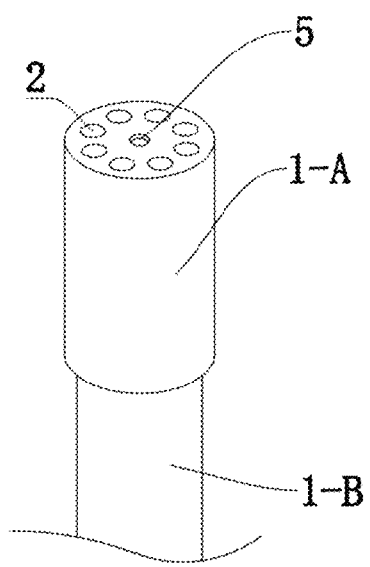
FIG. 6 is the appearance structure diagram of the soot-suppressing flame-separation combustion device for combustion calorimetry and in-situ free radicals monitoring in Embodiments 1 of the present invention.
Figure 7:
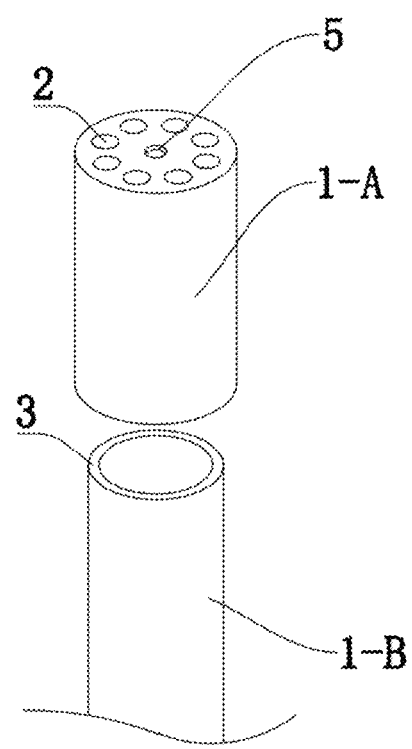
FIG. 7 is the split structure diagram of the soot-suppressing flame-separation combustion device for combustion calorimetry and in-situ free radicals monitoring in Embodiments 1 of the present invention.
Figure 8:
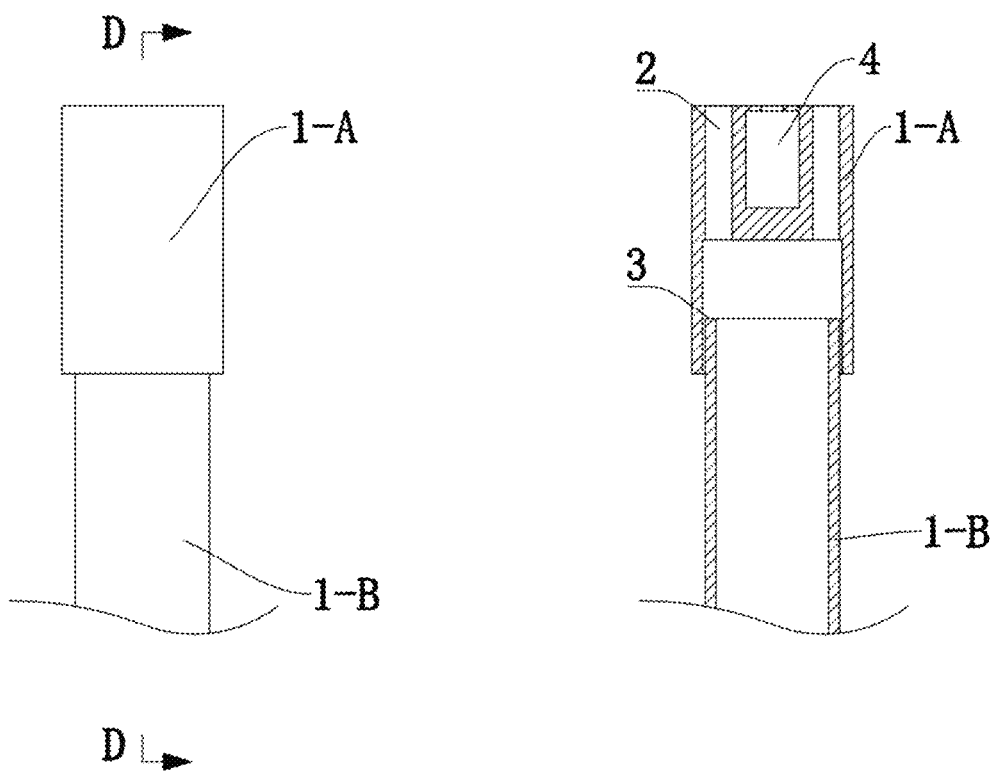
FIG. 8 is the side-view schematic diagram along the D-D line of the soot-suppressing flame-separation combustion device for combustion calorimetry and in-situ free radicals monitoring in Embodiments 1 of the present invention.

As shown in FIGS. 6-8, a soot-suppression flame-separation combustion device for combustion calorimetry and in-situ free radicals monitoring mainly includes a premixed combustion gas guide tube, an inner flame generated seat 3, an oxidizing flame separation guide member, and a sample combustion chamber 4, Wherein, the premixed combustion gas guide tube is an inner and outer casing structure with the inner tube 1-B sliding inside the outer tube 1-A, and the inner flame generated seat 3 formed by the end of the inner tube inside the outer tube, where the diameters of the outer and inner tube are 25 mm and 21 mm respectively, and the thickness of the inner tube is 2 mm;

The oxidizing flame separation guide member is disposed at the outlet of the premixed combustion gas guide tube and integrally molded with the outer tube 1-A. The sample combustion chamber 4 is disposed inside the oxidizing flame separation guide member and facing the inner flame generated seat. Eight oxidizing flame separation guide paths 2 are disposed around the sample combustion chamber in an equally spaced distribution in the oxidizing flame separation guide member, and communicated with the premixed combustion gas guide tube. wherein the length of oxidizing flame separation guide paths is set as 25 mm, and the diameter of the guide paths or the equivalent diameter of guide paths is set as 5 mm, to ensure the oxidizing flame occurring at the top of the oxidizing flame separation guide paths; the chamber of the sample combustion chamber 4 is cylindrical with the diameter of 10 mm and the height of 20 mm, and the distance between the sample combustion chamber 4 and the inner flame generated seat 3 is 40 mm; at the orifice, the distance between the center point of the oxidizing flame separation guide paths 2 and the center point of the sample combustion chamber 4 is 10 mm;

The sample combustion chamber 4 is provided with a combustion-product-outlet connected to the outside in the opposite direction towards the inner flame generated seat 3, and the combustion products nozzle 5 is disposed at the outlet of combustion products, wherein the diameter or the equivalent diameter of the combustion products nozzle 5 is set as ⅖ of the diameter or the equivalent diameter of the sample combustion chamber 4 to form a jet of combustion products.

Embodiment 2

Figure 9:
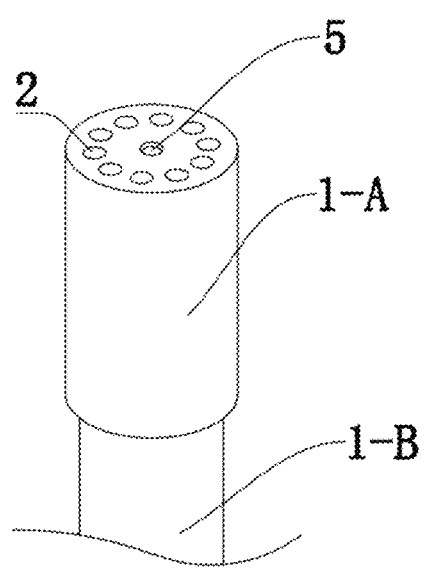
FIG. 9 is the appearance structure diagram of the soot-suppressing flame-separation combustion device for combustion calorimetry and in-situ free radicals monitoring in Embodiments 2 of the present invention.

As shown in FIG. 9, a soot-suppression flame-separation combustion device for combustion calorimetry and in-situ free radicals monitoring mainly includes a premixed combustion gas guide tube, an inner flame generated seat, an oxidizing flame separation guide member, and a sample combustion chamber, Wherein, the premixed combustion gas guide tube is an inner and outer casing structure with the inner tube 1-B sliding inside the outer tube 1-A, and the inner flame generated seat formed by the end of the inner tube inside the outer tube, where the diameters of the outer and inner tube are 25 mm and 21 mm respectively, and the thickness of the inner tube is 2 mm;

The oxidizing flame separation guide member is disposed at the outlet of the premixed combustion gas guide tube and integrally molded with the outer tube 1-A. The sample combustion chamber 4 is disposed inside the oxidizing flame separation guide member and facing the inner flame generated seat. Ten oxidizing flame separation guide paths 2 are disposed around the sample combustion chamber in an equally spaced distribution in the oxidizing flame separation guide member, and communicated with the premixed combustion gas guide tube. wherein the length of oxidizing flame separation guide paths is set as 25 mm, and the diameter of the guide paths or the equivalent diameter of guide paths is set as 4 mm, to ensure the oxidizing flame occurring at the top of the oxidizing flame separation guide paths; the chamber of the sample combustion chamber 4 is cylindrical with the diameter of 10 mm and the height of 20 mm, and the distance between the sample combustion chamber 4 and the inner flame generated seat 3 is 40 mm; at the orifice, the distance between the center point of the oxidizing flame separation guide paths 2 and the center point of the sample combustion chamber 4 is 10 mm;

The sample combustion chamber 4 is provided with a combustion-product-outlet connected to the outside in the opposite direction towards the inner flame generated seat 3, and the combustion products nozzle 5 is disposed at the outlet of combustion products, wherein the diameter or the equivalent diameter of the combustion products nozzle 5 is set as ⅖ of the diameter or the equivalent diameter of the sample combustion chamber 4 to form a jet of combustion products.

Comparative Example 1

Figure 10:
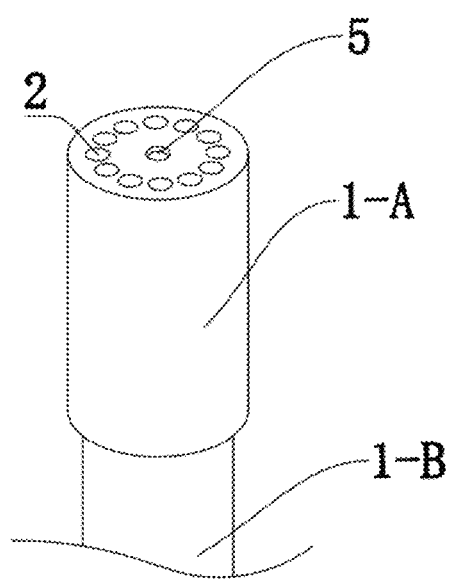
FIG. 10 is the appearance structure diagram of the soot-suppressing flame-separation combustion device for combustion calorimetry and in-situ free radicals monitoring in Comparative example 1 of the present invention.

As shown in FIG. 10, a soot-suppression flame-separation combustion device for combustion calorimetry and in-situ free radicals monitoring mainly includes a premixed combustion gas guide tube, an inner flame generated seat, an oxidizing flame separation guide member, and a sample combustion chamber, Wherein, the premixed combustion gas guide tube is an inner and outer casing structure with the inner tube 1-B sliding inside the outer tube 1-A, and the inner flame generated seat formed by the end of the inner tube inside the outer tube, where the diameters of the outer and inner tube are 25 mm and 21 mm respectively, and the thickness of the inner tube is 2 mm;

The oxidizing flame separation guide member is disposed at the outlet of the premixed combustion gas guide tube and integrally molded with the outer tube 1-A. The sample combustion chamber 4 is disposed inside the oxidizing flame separation guide member and facing the inner flame generated seat. Twelve oxidizing flame separation guide paths 2 are disposed around the sample combustion chamber in an equally spaced distribution in the oxidizing flame separation guide member, and communicated with the premixed combustion gas guide tube. wherein the length of oxidizing flame separation guide paths is set as 25 mm, and the diameter of the guide paths or the equivalent diameter of guide paths is set as 4 mm, to ensure the oxidizing flame occurring at the top of the oxidizing flame separation guide paths; the chamber of the sample combustion chamber 4 is cylindrical with the diameter of 10 mm and the height of 20 mm, and the distance between the sample combustion chamber 4 and the inner flame generated seat 3 is 40 mm; at the orifice, the distance between the center point of the oxidizing flame separation guide paths 2 and the center point of the sample combustion chamber 4 is 10 mm;

The sample combustion chamber 4 is provided with a combustion-product-outlet connected to the outside in the opposite direction towards the inner flame generated seat 3, and the combustion products nozzle 5 is disposed at the outlet of combustion products, wherein the diameter or the equivalent diameter of the combustion products nozzle 5 is set as ⅖ of the diameter or the equivalent diameter of the sample combustion chamber 4 to form a jet of combustion products.

Based on Embodiment 1, Embodiment 2 and Comparative example 1, to better illustrate the soot-suppression effect of the present invention, in the following Embodiments and Implementation plans, the relative radiation intensity of the flame during the combustion process at 600-800 nm (blackbody radiation luminescence area from soot) (relative radiation intensity=radiation intensity in current case/radiation intensity in comparative example* 100%) will be conducted as a technical index through comparison experiments:

| Serial numbers | Oxidizing flame separation guide paths | | relative radiation intensity (radiation intensity in current case/radiation intensity in comparative example* 100%) |
|---|---|---|---|
| | Numbers | Diameters | |
| Embodiment 1 | 8 | 5 mm | 22.4% |
| Embodiment 2 | 10 | 4 mm | 82.5% |

-continued

| Serial numbers | Oxidizing flame separation guide paths | | relative radiation intensity (radiation intensity in current case/radiation intensity in comparative example* 100%) |
|---|---|---|---|
| | Numbers | Diameters | |
| Comparative example 1 | 12 | 4 mm | 100% |

Embodiment 3

Figure 11:
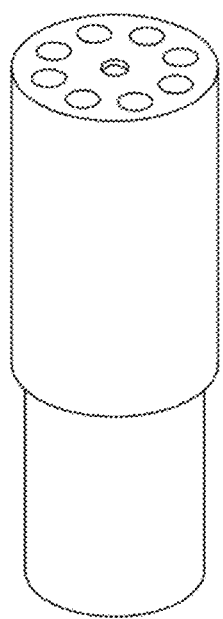
FIG. 11 is the appearance structure diagram of the soot-suppressing flame-separation combustion device for combustion calorimetry and in-situ free radicals monitoring in Embodiments 3 of the present invention.
Figure 12:
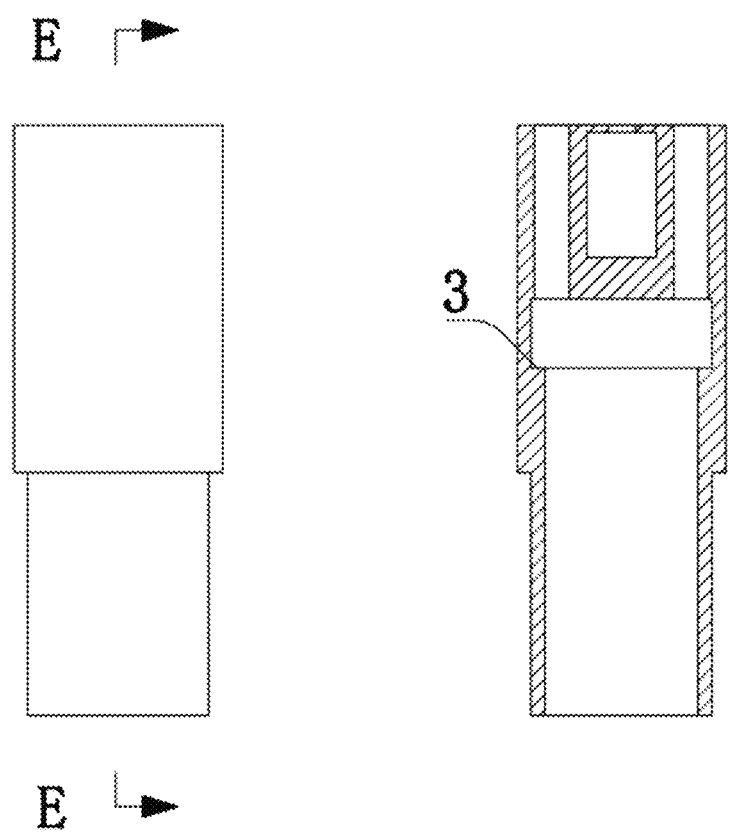
FIG. 12 is the side-view schematic diagram along the E-E line of the soot-suppressing flame-separation combustion device for combustion calorimetry and in-situ free radicals monitoring in Embodiments 1 of the present invention.

Embodiment 3 is a technical solution based on embodiment 1, but the difference is that the premixed combustion gas guide tube is not an inner and outer tube structure, but is a single tube body and integrally molded with the oxidizing flame separation guide member. The inner flame generated seat 3 is an annular raised structure perpendicular to the direction of the premixed combustion gas guide tube as shown in FIGS. 11-12.

Embodiment 4

Figure 13:
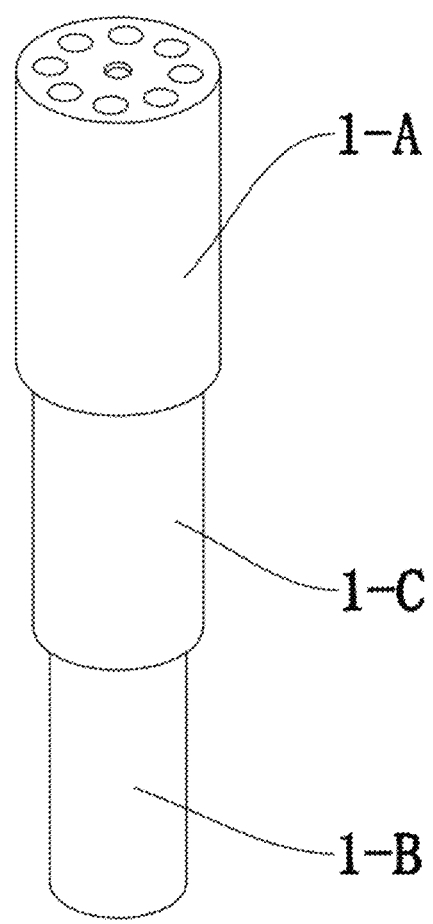
FIG. 13 is the appearance structure diagram of the soot-suppressing flame-separation combustion device for combustion calorimetry and in-situ free radicals monitoring in Embodiments 4 of the present invention.
Figure 14:
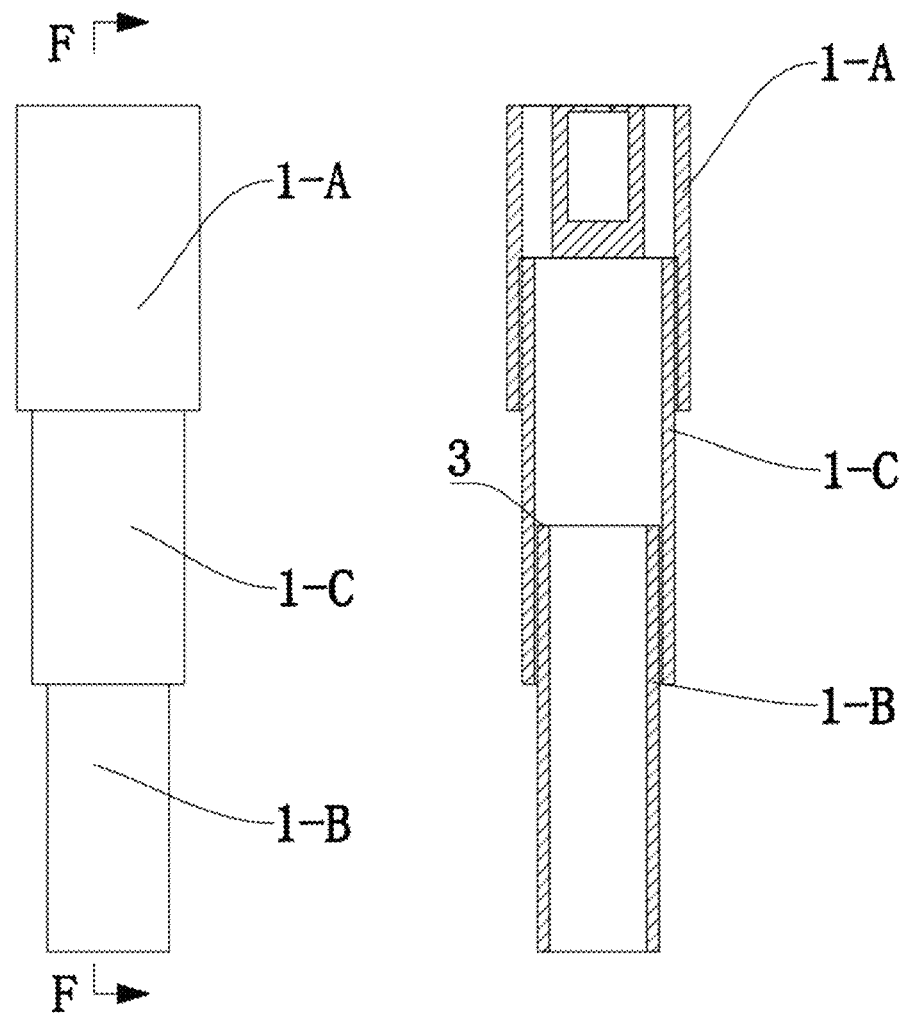
FIG. 14 is the side-view schematic diagram along the F-F line of the soot-suppressing flame-separation combustion device for combustion calorimetry and in-situ free radicals monitoring in Embodiments 4 of the present invention.

Embodiment 4 is a technical solution based on embodiment 1, but the difference is that the premixed combustion gas guide tube including a three-layer casing structure of an outer tube 1-A, a connection tube 1-C, and an inner tube 1-B from the outside to the inside, wherein the connection tube 1-C is nested and fixed inside the outer tube 1-A, and the inner tube 1-B is slidable inside the connection tube 1-C, and the inner flame generated seat 3 is formed by the inner tube at an end inside the connection tube, and the distance between the sample combustion chamber and the inner flame generated seat is adjusted by adjusting the position of the inner tube, as shown in FIGS. 13-14.

Figure 15:
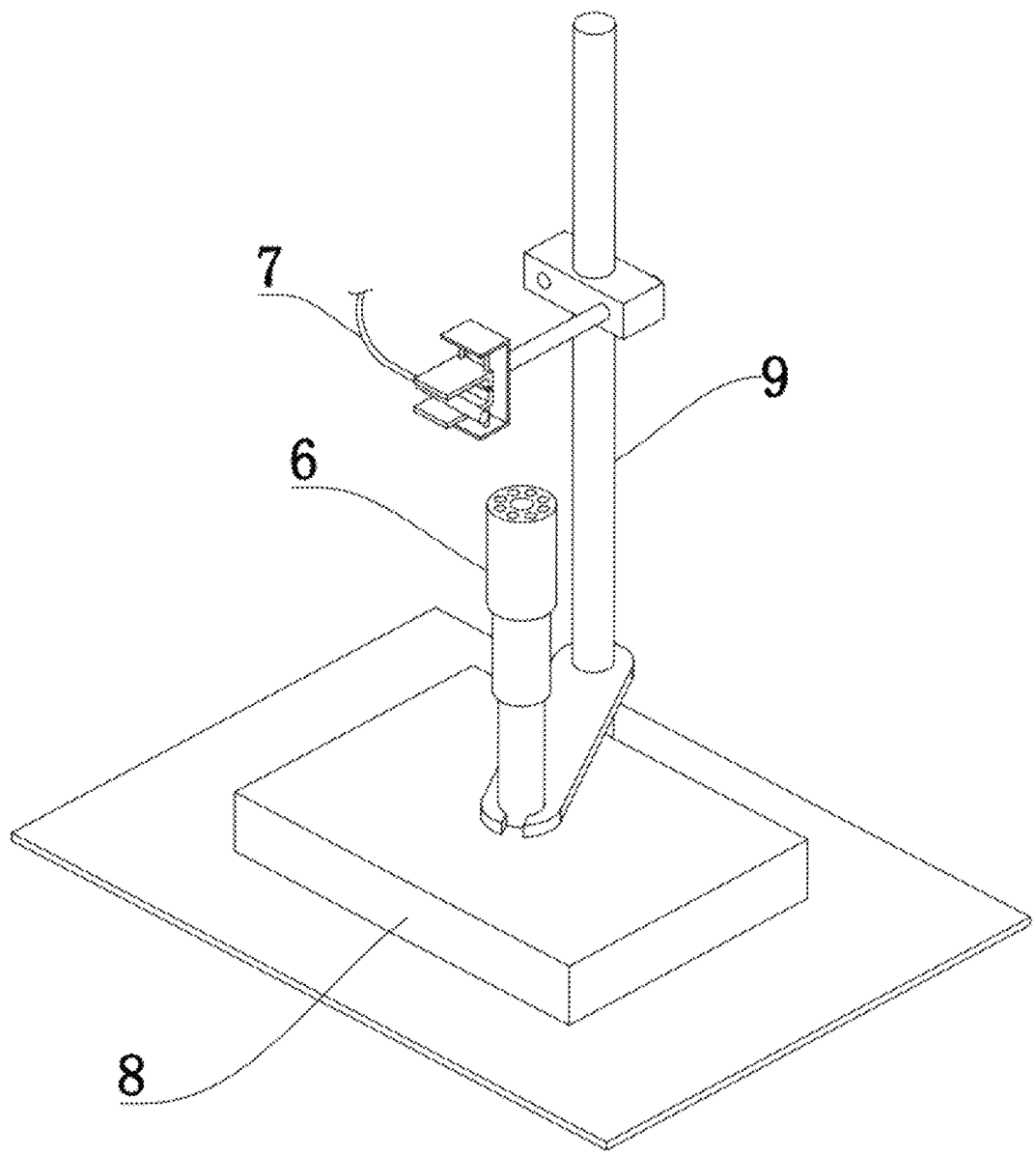
FIG. 15 is the appearance structure diagram of the combustion process online analysis instrument. Wherein, part of the structure of the spectrometer with the light-guide structure is omitted.

Based on the above technical effect that the soot-suppression flame-separation combustion device for combustion calorimetry and in-situ free radicals monitoring can reduce the interference from the soot generated during sample combustion to the spectral diagnostic techniques and improve the applicability of the spectral diagnostic techniques for sample combustion monitoring, the present invention also provides a combustion process online analysis instrument:

On the other hand, the present invention also provides a combustion process online analysis instrument for combustion processes, as shown in FIG. 15, which is mainly composed of a soot-suppression flame-separation combustion device 6 for combustion calorimetry and in-situ free radicals monitoring, and a spectrometer 7 with a light-guide structure.

Since the soot-suppression flame-separation combustion device for combustion calorimetry and in-situ free radicals monitoring provided by the present invention has a good soot suppression effect, the spectrometer with a light-guide structure can be directly installed on the side of the outer flame to achieve on-line real-time analysis, which is the first-of-its-kind in the field of the present technology.

The spectrometer 7 with a light-guide structure is a fiber optic spectrometer with a fiber optic probe provided on the side of the outer flame.

The soot-suppression flame-separation combustion device 6 for combustion calorimetry and in-situ free radicals monitoring is also connected to a premixed combustion gas supply device 8, wherein the premixed combustion gas supply device can provide a premixed combustion gas into the soot-suppression flame-separation combustion device for combustion calorimetry and in-situ free radicals monitoring.

To facilitate fixing the above soot-suppression flame-separation combustion device 6 for combustion calorimetry and in-situ free radicals monitoring and the spectrometer 7 with a light-guide structure, a fixing frame 9 is also provided.

Figure 16:
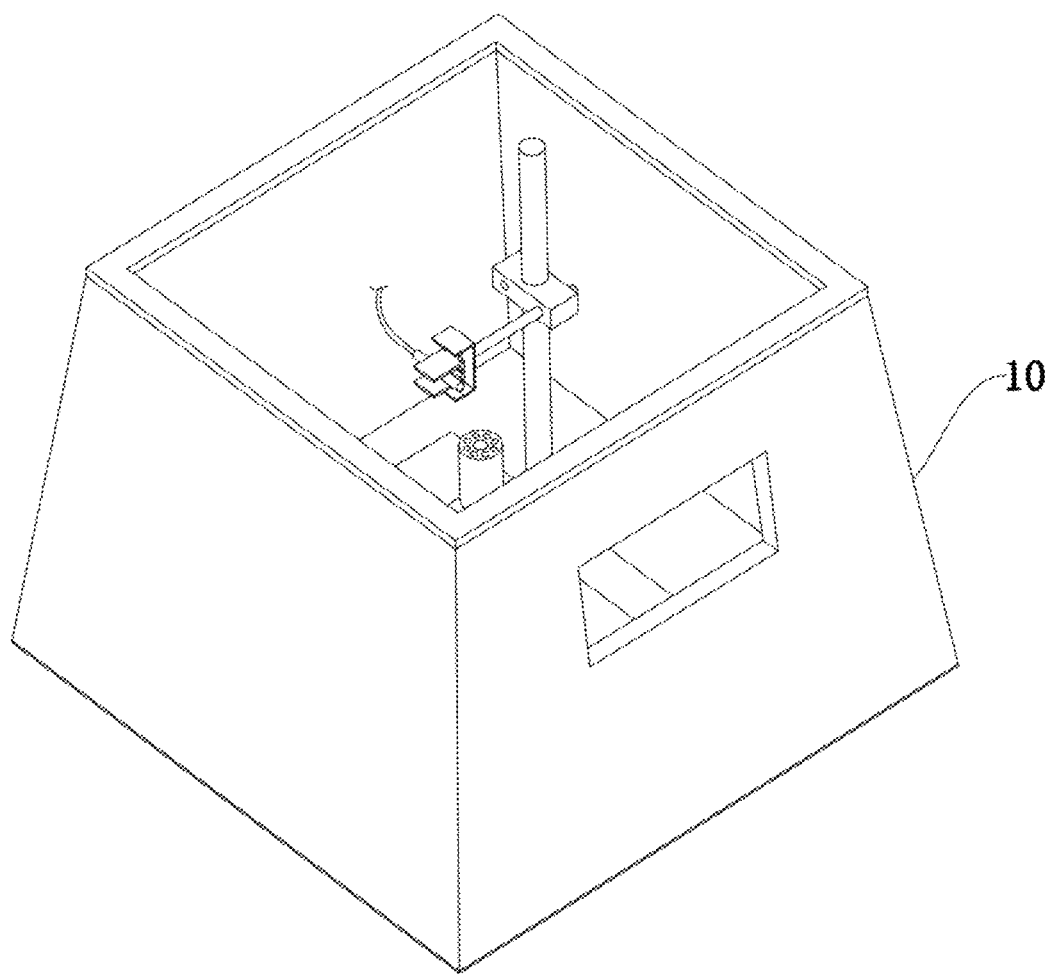
FIG. 16 is another appearance structure diagram of the combustion process online analysis instrument.

To facilitate observation while preventing the interference from wind and light, a wind-proof observation covers 10 is provided at the periphery of the above combustion process online analysis instrument, as shown in FIG. 16.

The above embodiments are preferred embodiments of the present invention, but the implementation methods of the present invention are not limited by the above embodiments. It is worth noting that the given embodiments should not be considered as limitations to the protection scope of the present invention, and any modifications, variations, substitutions, combinations, and simplifications made based on the present invention without departing from the spirit and principle of the present invention, shall be equivalent to the present invention, and are included in the scope of protection of the present invention.

What is claimed is:

1. A soot-suppression flame-separation combustion device for performing combustion calorimetry and for in-situ free radicals monitoring, the soot-suppression flame-separation combustion device comprising:
    a premixed combustion gas guide tube including an inner wall and an outlet;
    an inner flame generated seat disposed inside the premixed combustion gas guide tube;
    an oxidizing flame separation guide member disposed at the outlet; and
    a sample combustion chamber, wherein the inner flame generated seat comprises an annular protruding structure perpendicular to a direction of a premixed combustion airflow in the inner flame generated seat, the annular protruding structure including a first end and a first tip, wherein the first tip is disposed at least 0.1 mm away from the inner wall such that an inner flame is formed at the first end, and wherein the oxidizing flame separation guide member comprises:
    the sample combustion chamber disposed inside the oxidizing flame separation guide member and facing the inner flame generated seat such that the sample combustion chamber is directly heated by the inner flame;
    at least four oxidizing flame separation guide paths having a first top and disposed around the sample combustion chamber in an equally spaced distribution wherein each oxidizing flame separation guide path of the at least four oxidizing flame separation guide paths has a first length and a first diameter, wherein the at least four oxidizing flame separation guide paths are connected with the premixed combustion gas guide tube, wherein the first length between 5 mm and 500 mm, and the first diameter between 2 mm and 200 mm such that an oxidizing outer flame is formed at the first top, wherein the sample combustion chamber has a second diameter, a combustion products nozzle and a combustion products outlet having a third diameter connected to an outside of the sample combustion chamber in an opposite direction towards the inner flame generated seat and the combustion products nozzle is disposed at the combustion products outlet, wherein the third diameter between 1/10 and 4/5 of the second diameter so as to form a jet of combustion products.

2. The soot-suppression flame-separation combustion device according to claim 1, wherein the premixed combustion gas guide tube is a single-pass tube structure, wherein the premixed combustion gas has a guide flow having a first direction and in a single straight-line orientation, and the oxidizing flame separation guide paths have an orientation in the first direction.

3. The soot-suppression flame-separation combustion device according to claim 1, wherein the sample combustion chamber is at a distance between 5 mm and 300 mm from the inner flame generated seat.

4. The soot-suppression flame-separation combustion device according to claim 1, wherein the sample combustion chamber is cylindrical with the second diameter between 5 mm and 100 mm and a height between 3 mm and 100 mm.

5. The soot-suppression flame-separation combustion device according to claim 1, wherein the at least four oxidizing flame separation guide paths includes a connective line of structural centroids and the oxidizing flame separation guide member is provided with the at least four oxidizing flame separation guide paths disposed around the sample combustion chamber in an equally spaced distribution, wherein each of the at least four oxidizing flame separation guide paths is in a circular form and the connective line of structural centroids forms a circle.

6. The soot-suppression flame-separation combustion device according to claim 1, wherein the premixed combustion gas guide tube has an inner tube having an inner tube end having an inner tube wall and the inner flame generated seat is the inner tube, wherein the inner tube forms an inner-outer casing structure with the premixed combustion gas guide tube, and forms an annular protruding structure through the inner tube wall.

7. The soot-suppression flame-separation combustion device according to claim 1, wherein the premixed combustion gas guide tube has an inner diameter between 20 mm and 30 mm, the inner flame generated seat disposed inside the premixed combustion gas guide tube is an annular protruding structure perpendicular to the direction of the premixed combustion airflow in the premixed combustion gas guide tube, and the first tip of the annular protruding structure is disposed between 0.5 mm and 2 mm away from the inner wall of the premixed combustion gas guide tube such that the inner flame is formed at the first end of the annular protruding structure; the oxidizing flame separation guide member is disposed at the outlet of the premixed combustion gas guide tube, the sample combustion chamber is disposed inside the oxidizing flame separation guide member and directly faces the inner flame generated seat such that a sample is directly heated by the inner flame; the oxidizing flame separation guide member comprises 10 or 11 oxidizing flame separation guide paths disposed around the sample combustion chamber in an equally spaced distribution, and are connected to the premixed combustion gas guide tube, wherein the first length of each of the 10 or 11 oxidizing flame separation guide paths is between 40 mm and 200 mm, and the first diameter of each of the 10 or 11 oxidizing flame separation guide paths between 5 mm-50 mm such that the oxidizing outer flame is formed at the second top of the 10 or 11 oxidizing flame separation guide paths; the sample combustion chamber is cylindrical with the second diameter between 10 mm and 15 mm and has a sample combustion height between 20 and 30 mm, and the sample combustion chamber has a first distance from the inner flame generated seat between 20 mm and 60 mm; the sample combustion chamber is provided with the combustion products outlet connected to the outside of the combustion chamber in the opposite direction towards the inner flame generated seat, and the combustion products nozzle is disposed at the combustion products outlet, wherein the diameter the combustion products outlet is between ⅕ and ⅗ of the diameter of the sample combustion chamber so as to form the jet of combustion products; and the sample combustion chamber has a second distance from the 10 or 11 oxidizing flame separation guide paths between 2.5 mm and 5.0 mm.

8. The soot-suppression flame-separation combustion device according to claim 1, wherein the premixed combustion gas guide tube has an inner diameter between 20 mm and 30 mm, the inner flame generated seat disposed inside the premixed combustion gas guide tube is an annular protruding structure perpendicular to the direction of the premixed combustion airflow in the premixed combustion gas guide, and the first tip of the annular protruding structure is disposed between 0.5 mm and 2 mm away from the inner wall of the premixed combustion gas guide tube such that the inner flame is formed at the first end of the annular protruding structure; the oxidizing flame separation guide member is disposed at the outlet of the premixed combustion gas guide tube, the sample combustion chamber is provided inside the oxidizing flame separation guide member and directly faces the inner flame generated seat such that a sample is directly heated by the inner flame; the oxidizing flame separation guide member is provided with 8 or 9 oxidizing flame separation guide paths disposed around the sample combustion chamber in an equally spaced distribution, wherein the 8 or 9 oxidizing flame separation guide paths are connected with the premixed combustion gas guide tube, wherein the first length of each of the 8 or 9 oxidizing flame separation guide paths is between 50 mm and 160 mm, and the first diameter of each of the 8 or 9 oxidizing flame separation guide paths is set is between 8 mm and 40 mm such that the oxidizing outer flame is formed at the first top of the 8 or 9 oxidizing flame separation guide paths; the sample combustion chamber is cylindrical with the second diameter between 10 mm and 15 mm and a height between 20 mm and 30 mm, and the sample combustion chamber has a first distance from the inner flame generated seat between 20 mm and 60 mm; the sample combustion chamber is provided with the combustion products outlet connected to the outside in the opposite direction towards the inner flame generated seat, and the combustion products nozzle is disposed at the combustion products outlet, wherein the diameter of the combustion products outlet is between ⅖ and ⅗ the diameter of the sample combustion chamber so as to form the jet of combustion products; and the sample combustion chamber has a second distance from the 8 or 9 oxidizing flame separation guide paths between 2.5 mm and 5.0 mm.

9. An on-line combustion processes analysis instrument for performing combustion calorimetry and for in-situ free radicals monitoring comprising the soot-suppression flame-separation combustion device of claim 1 and a spectrometer comprising a light-guide structure.

* * * * *